UNITED STATES PATENT OFFICE.

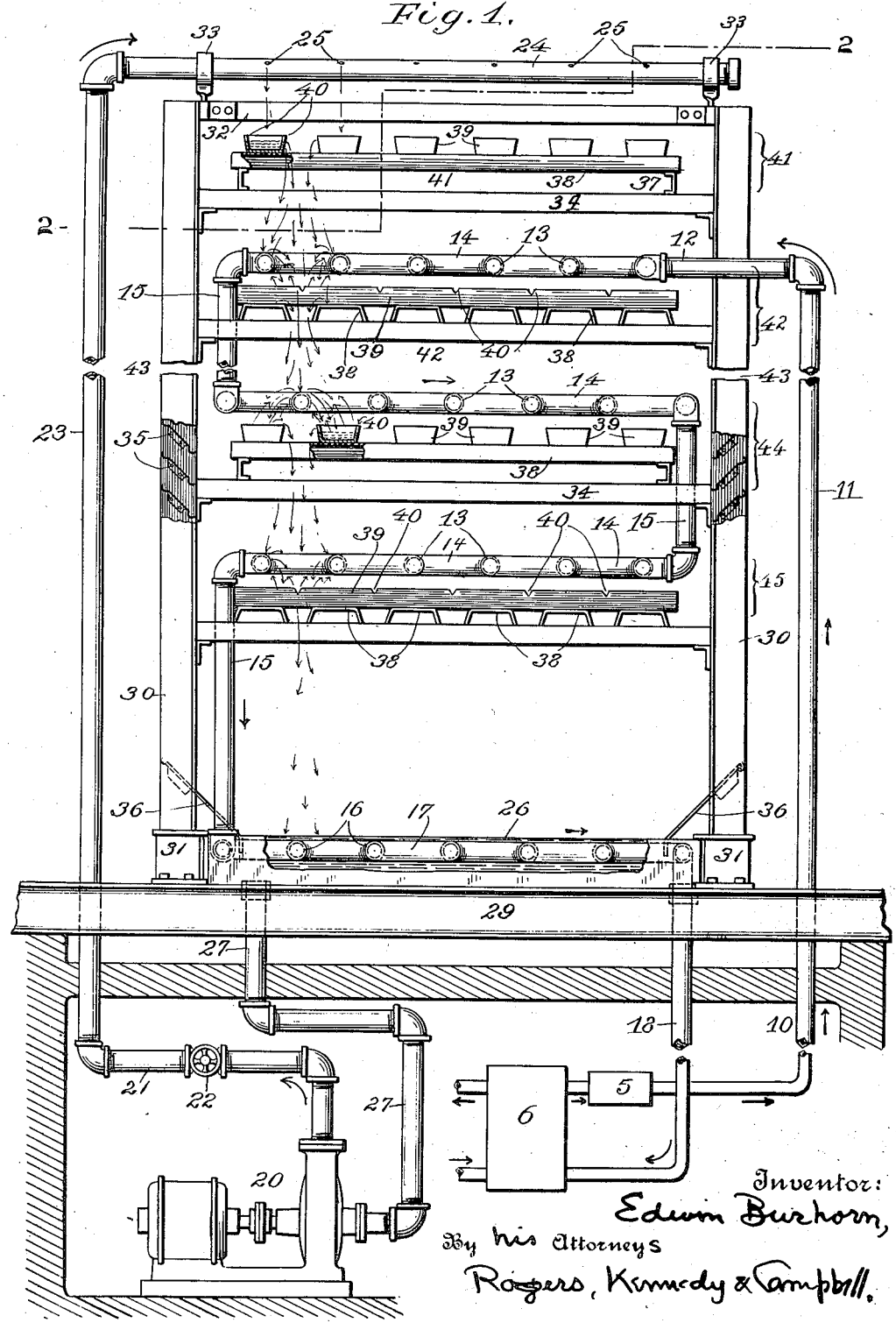

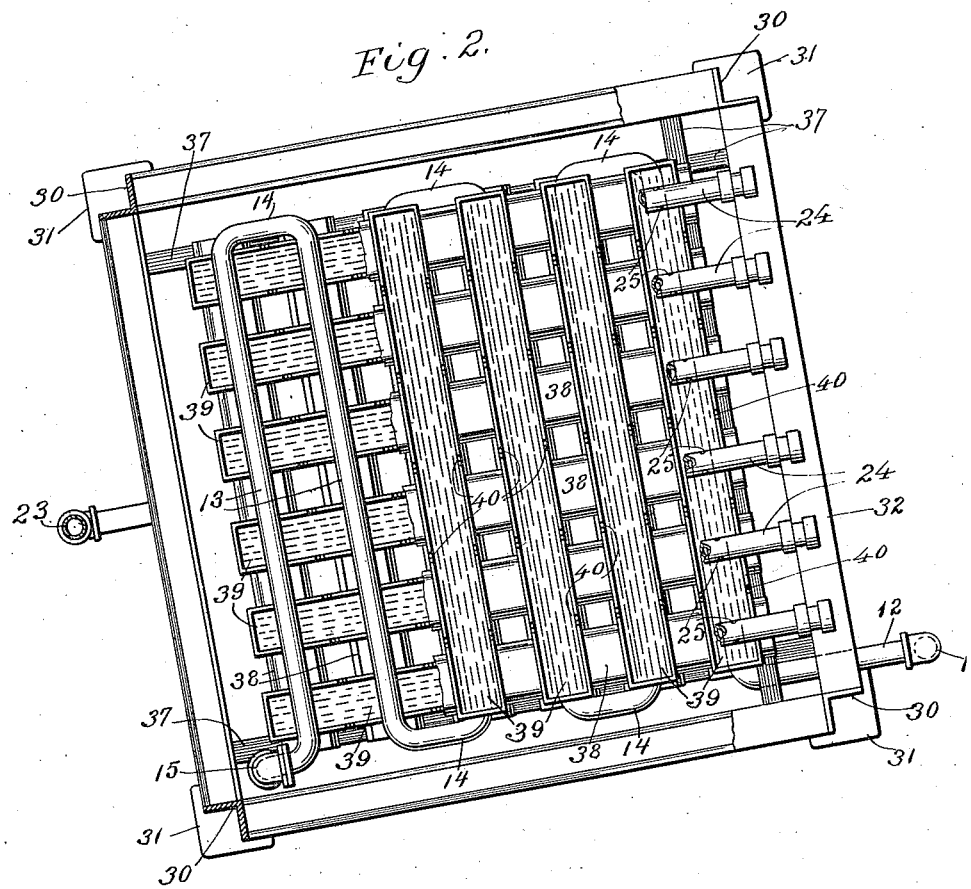
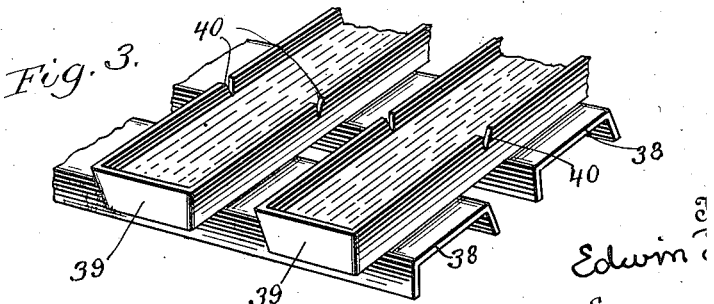

EDWIN BURHORN, OF HOBOKEN, NEW JERSEY.

COMBINED ATMOSPHERIC COOLING AND CONDENSING TOWER.

1,287,630.  Specification of Letters Patent.  Patented Dec. 17, 1918.

Application filed March 15, 1917. Serial No. 154,929.

*To all whom it may concern:*

Be it known that I, EDWIN BURHORN, a citizen of the United States, residing at Hoboken, in the county of Hudson and State of New Jersey, have invented a certain new and useful Combined Atmospheric Cooling and Condensing Tower, of which the following is a specification, reference being had therein to the accompanying drawing.

This invention is a combined atmospheric cooling and condensing tower. A mere cooling tower is an apparatus wherein the cooling effects of currents of atmospheric air are utilized to lower the temperature of water, which is distributed and passed through the tower by gravity, so as to be subjected to the requisite contact with atmospheric air, the cooled water being drawn off and passed, for example, to a condenser, and thereafter again passed through the apparatus. In the present invention the condensing operations are performed, on the contrary, in the cooling tower, with great advantage over any apparatus heretofore known to me, as will be hereinafter explained.

The main general objects of the invention are to secure increased efficiency in condensing power, as well as economy in size and cost of the apparatus. The apparatus is thus rendered advantageous for various condensing uses, for example, for use in connection with refrigerating plants of small capacity, such as those used at the depots of packing companies.

Another object is to provide a cooling and condensing tower wherein the cooling water is caused to pass downwardly by gravity through the tower, being cooled as it descends, and during its descent acting upon the vapor to be condensed, which vapor is conducted in suitable passages through the tower generally from the upper to the lower end, so that the cooling effect is progressive and cumulative, thus giving greater effectiveness of condensation than in heretofore known apparatuses.

Further objects and advantages of the present invention will appear in the hereinafter following description of one instance or embodiment of the improvements, or will be apparent to those skilled in the subject.

To the attainment of the objects and advantages referred to the present invention consists in the novel apparatus, process, combinations, arrangements and other features shown or described; but, since many of such features may be considerably altered without departing from the novel principles involved, I do not desire to limit the invention except to the extent set forth in the claims.

In the accompanying drawings forming a part hereof, Figure 1 is a general side elevation, somewhat diagrammatic and partly broken away and partly in section, showing a combined cooling and condensing tower embodying the present improvements.

Fig. 2 is a broken plan view, taken partly in section on the broken line 2—2 of Fig. 1.

Fig. 3 is a perspective of a detail showing the arrangement and support of the overflow troughs.

The general arrangement of the framework and water passages of the tower may be similar to the arrangements shown in prior patents of mine, of which I refer to Patent No. 1,118,267, issued November 24, 1914, Patent No. 1,171,412, issued February 15, 1916, Patent No. 1,234,444, issued July 24, 1917, and Patent No. 1,252,774, issued January 8, 1918. In the present described apparatus as well as in said prior patents, the water to be cooled is conducted by proper passages to the top of the tower and is there sprinkled or distributed, and, as it passes downwardly, is caught at different levels by what I have termed cooling decks, the water being held and delayed, and to some extent redistributed, and passed on downwardly toward the next succeeding deck, until, after passing through all of the decks, it is caught in a collecting pan. In the prior patents the water is subsequently drawn from the collecting pan to where it is to be utilized, for example, to the condenser in which the steam from an engine is condensed, or the condenser in which the ammonia vapor of a refrigerating apparatus is condensed, or the like; but in these respects the present apparatus is the contrary in operation and construction, and by the time the water has reached the collecting pan it has finished its work of progressively and cumulatively cooling the contents of or condensing the vapors within the conducting passages, which are led into the tower and combined with the cooling decks, as will be described.

My novel apparatus includes a tower of the type having its sides open to the passage of air currents, and provided with a series of cooling decks spaced successively one below another, together with passages for conducting cooling water to the upper end of the tower and a system of condensing passages by which the vapor or fluid to be condensed or cooled may be conducted through the apparatus, such passages extending successively from one to another of a plurality of such cooling decks. The novel method involved is one for cooling or condensing any given fluid or vapor, which consists in conducting the fluid progressively through an elongated system of passages from an upper level to downwardly trending levels, and simultaneously causing a cooling liquid or water to descend from level to level by gravity, subject to cooling effects or air currents, and cumulatively transmitting the cooling effects to the fluid in such passages, the heat extraction being due not only to the warming up of the falling water, but to its actual vaporization in considerable quantities and the constant blowing away of the vapors from the hot pipes.

Although the invention is not restricted to use for condensing ammonia vapor, it is particularly useful therefor, and so, to indicate a complete apparatus, I have conventionally illustrated a refrigerating plant of the ammonia compression type, in which the ammonia vapor is compressed in a compressor 5, from which passes the hot vapor to be condensed, the liquid ammonia thereafter passing into the expansion coils in brine tank 6, where it yields the desired cooling effect, and thereafter passes again to the compressor 5.

All this apparatus is only diagrammatically or conventionally shown. Instead of passing the hot ammonia vapors to the usual condenser, they are conducted, according to my invention, through the combined cooling and condensing tower hereof, as previously stated. Thus, the outlet of the compressor connects with the vapor inlet 10 of my apparatus, while the outlet 18 of my apparatus leads to the brine tank 6 of the refrigerating system.

It will be convenient to first describe the construction of the vapor passages and the course of the vapor through my apparatus, before describing the details of the tower and the water communications. The vapors passing upwardly from the inlet 10 are conducted by pipe 11 to a point above the uppermost, or one of the upper decks, of the cooling tower. Thus, by an elbow joint the upward pipe 11 is connected to a horizontal pipe 12, which leads to a horizontal system of piping arranged closely above the second cooling deck. Thus, the passage in pipe 12 is continued in a series of longitudinal courses 13, 13, connected at their ends by shorter sections 14, 14, etc. This arrangement is seen in plan view in Fig. 2, and it cooperates with the arrangement of the members constituting the cooling decks above and below, respectively, as will be more fully described. From the end of the last course 13 of vapor passage at this level is a downward section 15 of pipe, which extends to a corresponding level above and with relation to another cooling deck of the tower. At this level the backwardly and forwardly extending courses of vapor passage may be repeated, followed by another downward section 15, and another repetition of the horizontal courses 13, 14, and so on through the tower, until after the last cooling level the passage may be extended downwardly by pipe 15 and horizontal courses 16 and 17, immersed within the body of water in the collecting pan, the vapor passage finally extending out of the apparatus by the exit or outlet 18, previously mentioned.

The water may be maintained in circulation by a pump 20, from which it is conducted by a passage 21 having a valve 22, and a passage 23 to a series of distributing pipes 24 at the top of the tower, the pipes 24 having a certain arrangement of apertures 25, coöperating with the arrangement of the cooling decks beneath.

After traversing the height of the tower, the water is collected in the pan 26, within which are immersed the courses 16 and 17 of vapor passage for their final cooling or condensation. From the pan the water passes outwardly by gravity through passages 27, to the pump 20. The pump may be considered as located in the top loft of a building, and the tower supported on girders 29 above the roof.

The tower frame may conveniently be generally square and of any desired height, depending on the number of cooling decks desired. The corner posts 30 extend upwardly from base castings 31, which, with the collecting pan 26, are suitably mounted above the supporting girders 29. At the top are stiffening cross bars 32, which also give support to brackets 33 that hold the distributing pipes 24, while frame bars 34 at the several cooling levels give further rigidity to the structure. For purposes that are explained in my prior patents, inclined louvers 35 may be provided around the sides of the tower, serving to enhance the cooling effect of the atmospheric air and to prevent the loss of water. The lowermost louver 36 at each side is shown as extending inwardly to insure that all water falling within the tower will pass to the collecting pan.

The elements constituting the cooling decks may comprise supporting girders 37, inverted channel bars 38 and parallel troughs 39, having overflow notches 40. Beneath the distributing pipes 24 is shown, first, the topmost cooling deck 41, then spaced substantially below that is the second cooling deck 42. And any number of decks may follow, as indicated by the horizontal break 43, below which are shown further cooling decks 44 and 45, from the last of which the water drops directly into the collecting pan 26.

The particular structure and arrangement of elements at each cooling deck may be indefinitely varied, and the successive decks may have arrangements differing from each other. Thus, the parallel troughs 39 in each deck are shown as arranged at right angles to those in the decks above and below. Whatever the structure, the arrangement is preferably such that the distributed water falling from each deck is caught wholly or partially at the deck next beneath, and there redistributed before passing downward to the decks below that, so that little, if any, of the cooling water will be permitted to pass continuously by gravity from the top to the bottom of the tower.

The arrangements at the cooling decks may be as shown in the drawings and described as follows.

In the topmost deck 41 the troughs 39 stand parallel to each other, spaced slightly apart and extending at right angles to the distributing pipes 24 above. Each trough 39 stands beneath a row of distributing apertures 25 in the pipes 24. Thus, each trough 39 is supplied with water, and, the trough being horizontal, the water is substantially evenly distributed over its length. Each trough has at each side a row of overflow notches 40, and the notches of the several troughs are arranged substantially in alinement with each other and directly above the spaces which are provided between the inverted supporting channels 38. The plan view, Fig. 2, shows the relative arrangement and indicates that a great number of downward overflow streams will be produced, distributed evenly over the whole area of the tower. The overflow and downfall is not exactly regular nor vertical, and the particles of water will be more or less distributed and scattered, as indicated in Fig. 1.

The water, then, in a fine state of distribution descends to the second deck 42. During this short passage the water is first subject to the cooling action of air currents, such as those produced by natural movement of the atmosphere. Before reaching the troughs of the second deck the downfall meets and performs a cooling effect upon the horizontal courses 13 and 14 of the pipe or passages containing the ammonia gas or other fluid to be cooled or condensed, which at this stage in the operation are relatively hot. The descending water is then received in the troughs 39 of the second deck 42. These troughs are at right angles to those in the first deck, and are preferably located directly beneath the spaces between the inverted channel bars 38 of the first deck, so that the troughs in the second deck will receive the major part of the falling water. The water dripping from the pipes 13 and 14 will also pass partly into the troughs. It will be noticed that the vapor pipes and the troughs are so arranged that the splashes caused by the water falling into the troughs will tend to wet, and therefore cool the undersides of the pipes, so that the pipes are thus wetted and cooled at both their upper and under sides. The cooling effect, moreover, it will be understood, is the more effective because of the vaporization of water from the continually wetted surfaces, the water vapor being carried off by the natural air currents, and the vaporization extracting a large quantity of heat from the vapors within the pipes.

When the falling water and the inclosed vapors reach the next deck beneath, they will both be in a cooler condition, and, the cooling action of the water upon the vapors being repeated under these conditions, the cooling action will be what may be termed cumulative; the falling water is progressively cooled as it descends by the action of air currents, and the cooling effect thus attained by the water is transmitted progressively in increasing degrees to the gradually cooling vapor. The vapor passages trend downwardly in the direction of the water travel, so that the cooling effects are cumulatively transmitted from the air to the cooling water and from the water through the pipes to the vapor.

The water falling upon the cooling deck 44 is shown as impacting in substantial quantities upon the vapor pipes 13 and 14 as before, and such of the water as falls directly into the troughs 39 will be partly splashed against the vapor pipes, as before. Substantially this operation continues throughout all the cooling decks, and finally the cooling or condensation of the vapor is completed by its passage through the pipes 16 and 17, which are actually immersed in the cooled water in the collecting pan 26, the condensed ammonia being drawn off by the outlet 18 for utilization in the refrigerating machine.

The operation has been sufficiently indicated. The heated vapor passes to an upper deck, and then to a lower one, and finally to a level immersed in the collecting pan, and thence to the expansion chamber of the refrigerating system, after which it is again compressed, and then again cooled in my apparatus. The water, like the ammonia, may be used over and over, and I find that, even in summertime when the atmosphere is at a temperature of 80°, the water entering the upper end of the tower at a temperature of 90° will be cooled by contact with the air and vaporization to an extent of 10°, leaving the tower at substantially 80°, and in its descending passage serving to condense and cool the ammonia, to substantially the same point.

It will thus be seen that I have described a method and apparatus illustrating the principles and attaining the objects and advantages of the present invention.

I claim:

1. A combined atmospheric cooling and condensing tower comprising the tower structure having its sides open to the passage of natural currents of atmospheric air, means for supplying cooling water at the tower upper end, and a series of cooling decks spaced successively one below another arranged to receive descending water and deliver it downwardly, in combination with condensing pipes extending successively to and arranged in extended formation in a plurality of tiers between said cooling decks so as to be exposed at each tier to both the descending water and the natural air currents.

2. A combined atmospheric cooling and condensing tower comprising the tower structure having its sides open to the passage of natural currents of atmospheric air, means for supplying cooling water at the tower upper end, and a series of cooling decks spaced successively one below another arranged to receive descending water and deliver it downwardly, in combination with condensing pipes extending successively to and arranged in downwardly trending tiers between said cooling decks so as to be progressively exposed at the successive tiers to both the descending water and the natural air currents.

3. A combined atmospheric cooling and condensing tower comprising the tower structure having its sides open to the passage of natural currents of atmospheric air, means for supplying cooling water at the tower upper end, a series of cooling decks spaced successively one below another arranged to receive descending water and distribute and deliver it downwardly, and a collecting vessel near the tower bottom, in combination with condensing pipes extending to the tower upper portion and arranged in downwardly trending manner between said cooling decks so as to be exposed to both the descending water and the natural air currents, and with the lowermost pipes immersed in said collecting vessel.

In testimony whereof, I have affixed my signature hereto.

EDWIN BURHORN.

Witnesses:
 E. Senbe,
 H. Stoner.